UNITED STATES PATENT OFFICE.

AUGUST J. METZLER, OF BROOKLYN, ASSIGNOR TO C. C. PUFFER, OF ROCHESTER, NEW YORK.

PROCESS OF MAKING BEER.

SPECIFICATION forming part of Letters Patent No. 436,535, dated September 16, 1890.

Application filed December 31, 1888. Serial No. 295,075. (No specimens.)

*To all whom it may concern:*

Be it known that I, AUGUST J. METZLER, a citizen of the United States, residing at Brooklyn, county of Kings, State of New York, have invented a certain new and useful Improvement in the Process of Making Beer; and I do hereby declare the following to be a full, clear, and exact description of the invention, such as will enable others skilled in the art to which it pertains to make and use the same.

The state of the art may be briefly summarized as follows: The old process of making beer consisted in carrying it through its first fermenting stage in open tubs. Then it was drawn off into ruh-casks, where it was permitted to rest quietly under a low temperature for several months. Here under an exceedingly slow and scarcely perceptible fermentation it underwent those chemical changes whereby it acquired the qualities known as "age" or "ripening." These ruh-casks were open—that is to say, were not bunged up. When sufficiently ripened, it had to undergo another process to prepare it for the market—that is to say, it had to have imparted to it the life requisite to make it a desirable beverage. To do this, the casks were bunged up, and after a long period—several weeks and sometimes months—the slow fermentation would accumulate a pressure of carbonic-acid gas sufficient to enliven it. It was then ready to market. The great length of the process was attended with many evils. It was liable to take on putrid odors or flavors, owing to impurities about the cellars or in the casks or by the chemical decomposition of elements associated with the beer ingredients; but the greatest objection was the great storage capacity required by the brewer, for if the process lasted six months he must needs possess the capacity to store at once a quantity equal to at least half his annual output with the attendant expenses of refrigeration. This general process has in late years been superseded to a considerable extent by a process which materially shortened the period required to prepare the ripened ruh-beer for the market. To this end the ripened ruh-beer was drawn off into shavings-casks. Here was added a quantity— seven per cent. to twenty-five per cent., more or less—of young beer, or "kraeusen," as it is termed, fresh from the fermenting-tubs. This induced a quick and rapid fermentation. Sometimes finings were added at once with the kraeusen and the casks immediately bunged up, or sometimes the casks were permitted to remain open a few days until the violence of the fermentation had subsided, when finings were added and the casks bunged. In either case the generation thereafter of carbonic-acid gas quickly accumulated a pressure adequate to facilitate the clarification and enliven the beer, so that within a period of ten or fifteen days, more or less, from the time it was drawn into the shavings-casks the beer was ready for the market. By this process the introduction of the young beer or kraeusen detracted to that extent from the age or "ripeness" of the ruh-beer. Speed in the process was therefore gained at the expense of quality.

Again, another process has recently been introduced by which the beer in the ruh stage has been maintained under a partial vacuum, thus producing the requisite age or ripened qualities in a very short time—seven to ten days, more or less—thus greatly shortening the ruh-stage, after which it was prepared for the market in the shavings-casks by the use of kraeusen, as above explained.

My present invention is in the nature of an improvement in the last-named process; and it consists in so treating the ruh-beer thus ripened under a vacuum that it is by my treatment prepared for the market without the use of kraeusen, and consequently without reducing the age or ripeness of the ruh-beer. To this end I proceed as follows: I bring the ruh-beer to its ripened condition under a partial vacuum, as above explained. The vacuum has caused it to part with the air originally held in suspension by it; but it stands, as it were, like a squeezed sponge, with its pores open ready to reabsorb whenever the vacuum is relieved. In this condition I introduce carbonic acid into the beer until there is a pressure of carbonic-acid gas sufficient to give to the beer the requisite life for the market. Should the ruh-beer be turbid and the pressure alone be insufficient to settle and clarify it, finings may be added either before or after the pressure is applied. Reliance may be had upon the saccharine constituents of the ruh-beer and upon the remnants of yeast contained therein to maintain that incipient action necessary to give lasting qualities to the beer. The temperature of the cellar should preferably be low throughout the process. I have employed about 32° to 34° Fahrenheit. So, also, I have found about eighteen inches mercury-vacuum to be convenient therewith under which to maintain the ruh-beer, and have employed about seven pounds' pressure of carbonic-acid gas in the last step of the process. In this way beer can be ripened in about seven to ten days after drawing from the fermenting-tubs into the ruh-casks, and may be marketed in five or six days, more or less, after pressure is applied. The use of the kraeusen has been avoided, and the age or ripeness of the beer has consequently not been impaired. Moreover, the celerity of the process has reduced to the minimum the liability to acquire putrid flavors or odors. The storage capacity for a given output is correspondingly small, and the brewer profits largely by the speed with which he may turn his capital.

I would have it understood that I do not limit myself to the maintenance of 32° to 34° Fahrenheit in the cellars, nor to eighteen inches mercury vacuum, nor to seven or eight pounds of gas pressure, nor to seven to ten days in the ruh stage and five or six in the finishing stage, for all these conditions may be changed within reasonable limits. So, also, the vacuum may be applied some time after the beer has been drawn into the ruh casks, instead of from the time it enters the said casks.

I do not desire in this application to lay specific claims to the particular features of improvement embodied in my several applications, Serial Nos. 295,074, 295,076, and 295,077, each filed December 31, 1888.

What I claim is—

1. The within-described process of making beer, the same consisting in maintaining the beer in the ruh stage under a partial vacuum until ripened, then relieving the vacuum with carbonic-acid gas and continuing the introduction of carbonic acid until the gas-pressure is sufficient to impart the desired life to the beer and holding the same thus under pressure until ready for the market, substantially as described.

2. The within-described process of making beer, the same consisting in maintaining the beer in the ruh stage under a vacuum of about eighteen inches at a temperature of about 32° to 34° Fahrenheit until ripened, then relieving the vacuum with carbonic-acid gas and continuing the introduction of carbonic acid until the gas-pressure reaches about seven pounds, more or less, and holding the same thus under a low temperature until ready for the market, substantially as described.

3. The process of making beer herein described, the same consisting in maintaining the beer in the ruh stage under a partial vacuum until ripened, then relieving the vacuum with carbonic-acid gas and continuing the introduction of carbonic acid until the gas-pressure is sufficient to impart the desired life to the beer, and either just before or after the pressure is applied adding finings to assist in clarifying the beer, substantially as described.

In testimony whereof I sign this specification in the presence of two witnesses.

AUGUST J. METZLER.

Witnesses:
 WASH. L. JAQUES,
 C. C. PUFFER.